United States Patent
Park et al.

(10) Patent No.: US 12,259,358 B2
(45) Date of Patent: Mar. 25, 2025

(54) EDDY CURRENT SENSOR FOR DETECTING CRACK OF BATTERY CELL AND SYSTEM FOR DETECTING CRACK OF BATTERY INCLUDING THE SAME

(71) Applicant: LG ENERGY SOLUTION, LTD., Seoul (KR)

(72) Inventors: Ji Won Park, Daejeon (KR); Kwang Hyun Kim, Daejeon (KR); Yeon Hyuk Heo, Daejeon (KR); Jae Won Jeong, Daejeon (KR); Eun Gu Han, Daejeon (KR); Min Su Hwang, Daejeon (KR); Myung Han Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 175 days.

(21) Appl. No.: 17/790,873

(22) PCT Filed: Oct. 27, 2021

(86) PCT No.: PCT/KR2021/015230
§ 371 (c)(1),
(2) Date: Jul. 5, 2022

(87) PCT Pub. No.: WO2022/197991
PCT Pub. Date: May 12, 2022

(65) Prior Publication Data
US 2023/0026325 A1  Jan. 26, 2023

(30) Foreign Application Priority Data
Nov. 5, 2020  (KR) ........................ 10-2020-0147011

(51) Int. Cl.
*G01N 27/90* (2021.01)
*H01M 10/42* (2006.01)
*H01M 10/48* (2006.01)

(52) U.S. Cl.
CPC ..... *G01N 27/9006* (2013.01); *G01N 27/9046* (2013.01); *H01M 10/4285* (2013.01); *H01M 10/48* (2013.01)

(58) Field of Classification Search
CPC .... G01N 27/90–9093; G01M 10/4285; G01M 10/48
(Continued)

(56) References Cited

U.S. PATENT DOCUMENTS 6,291,992 B1   9/2001  van Andel et al.
6,707,296 B2   3/2004  Looijer
(Continued)

FOREIGN PATENT DOCUMENTS

CN   103810782 B        2/2017
CN   107064291 A  *     8/2017   ......... G01N 27/9033
(Continued)

OTHER PUBLICATIONS

Kenji; Translation of JP2015105947A; Jun. 8, 2015 (Year: 2015).*
(Continued)

*Primary Examiner* — Paresh Patel
*Assistant Examiner* — Rahul Maini
(74) *Attorney, Agent, or Firm* — MORGAN, LEWIS & BOCKIUS LLP

(57) ABSTRACT

The present invention relates to an eddy current sensor for detecting a crack in a battery cell, and a system for detecting a crack of a battery cell including the eddy current sensor. According to the present invention, it is possible to easily detect a crack generated in an electrode, an electrode tab or a welded portion.

15 Claims, 7 Drawing Sheets

(58) Field of Classification Search
USPC .......................................................... 324/222
See application file for complete search history.

(56) References Cited

U.S. PATENT DOCUMENTS

| | | | |
|---|---|---|---|
| 10,520,634 B2* | 12/2019 | Clay ..................... | G01N 27/902 |
| 11,761,927 B2* | 9/2023 | Kim ................... | G01N 27/9046 |
| | | | 324/222 |
| 2008/0290866 A1* | 11/2008 | Cuffe ................ | G01N 27/9046 |
| | | | 324/233 |
| 2015/0340744 A1 | 11/2015 | Knobloch et al. | |

FOREIGN PATENT DOCUMENTS

| | | | | |
|---|---|---|---|---|
| CN | 107422029 A | * | 12/2017 | ............. G01N 27/90 |
| CN | 111273359 A | | 6/2020 | |
| JP | 2002-533659 A | | 10/2002 | |
| JP | 2009-252644 A | | 10/2009 | |
| JP | 2015-105947 A | | 6/2015 | |
| KR | 10-2012-0031939 A | | 4/2012 | |
| KR | 10-2013-0089430 A | | 8/2013 | |
| KR | 10-2023739 B1 | | 9/2019 | |
| KR | 10-2020-0005290 A | | 1/2020 | |

OTHER PUBLICATIONS

Ning; Translation of CN107422029A; Dec. 1, 2017 (Year: 2017).*
Cao; Translation of CN 103810782A; Feb. 8, 2017 (Year: 2017).*
Gao et al.; Translation of CN 107064291 A; Pub. Date Aug. 18, 2017; Translated by EPO & Google (Year: 2017).*
International Search Report (with partial translation) and Written Opinion dated Feb. 10, 2022 issued in corresponding International Patent Application No. PCT/KR2021/015230.
Extended European Search Report dated Jun. 16, 2023 issued in the European Patent Application No. 21889456.6.

* cited by examiner

[FIG. 1]
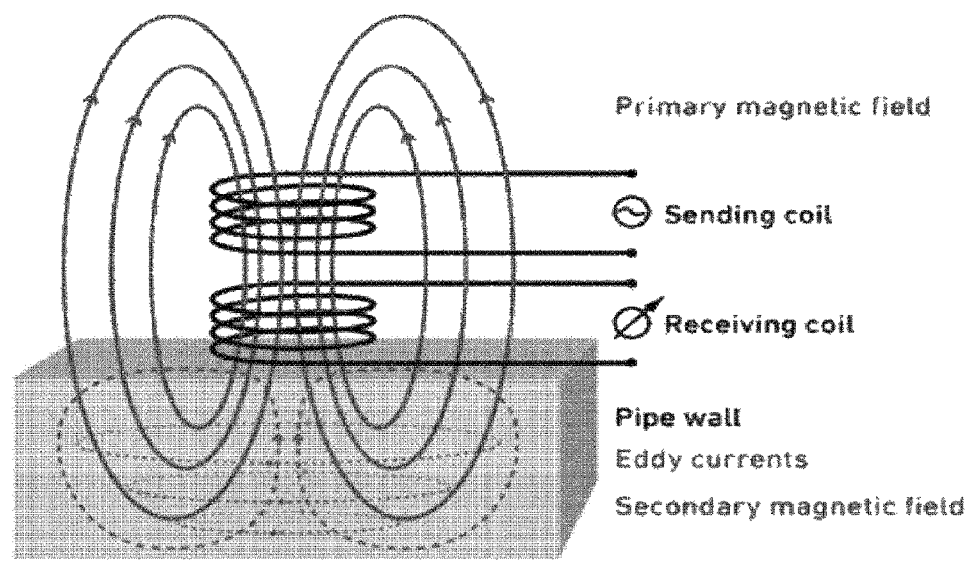

[FIG. 2]
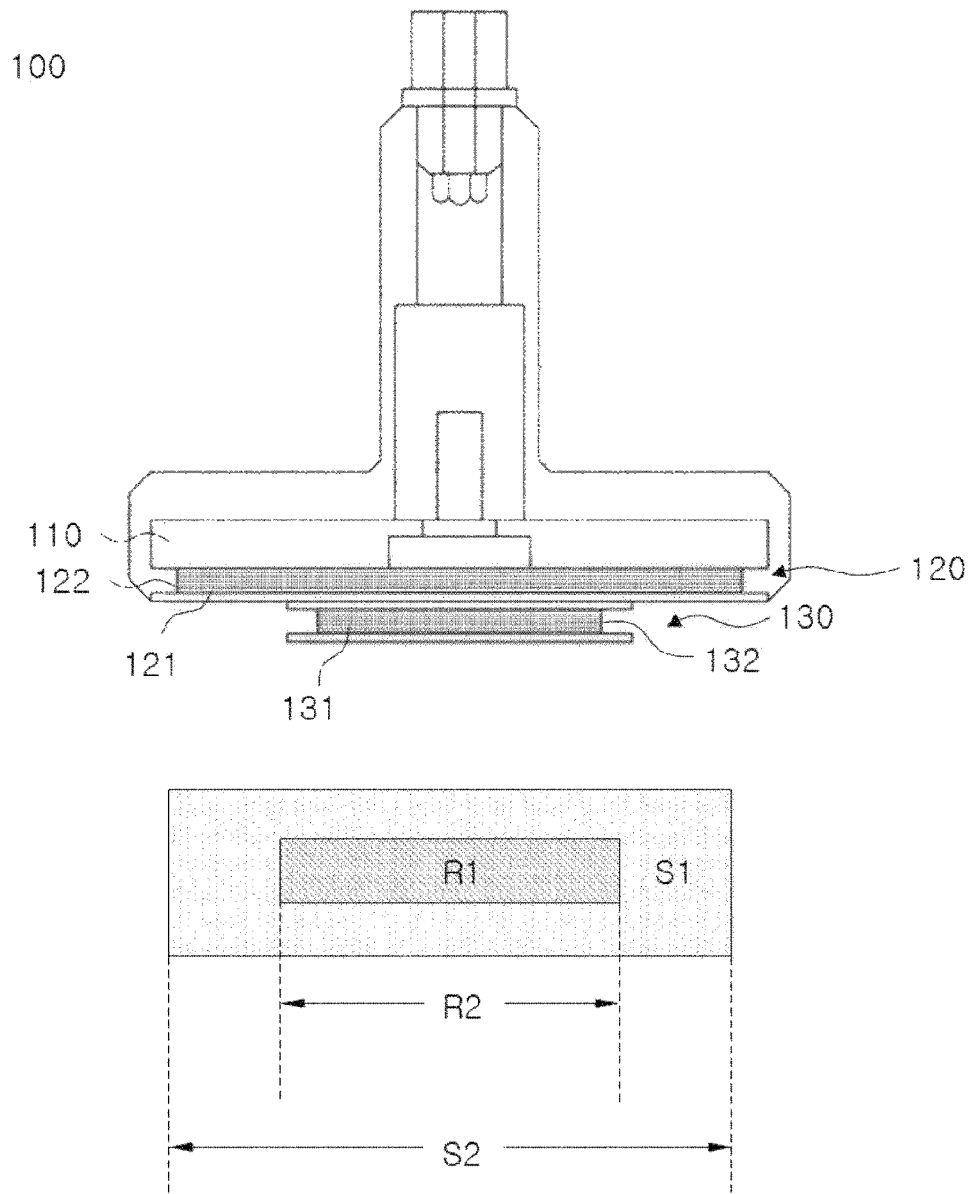

[FIG. 3]
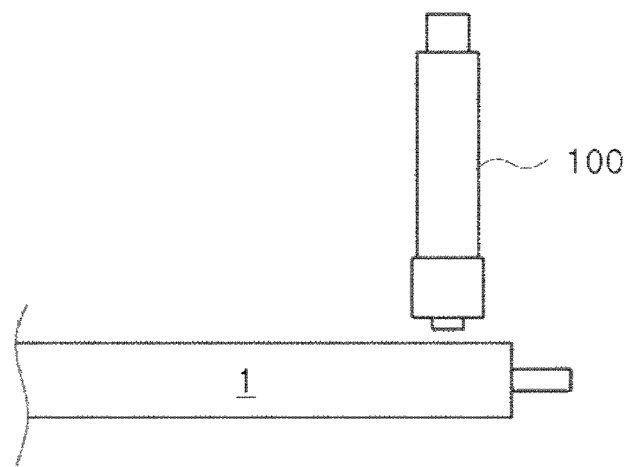

[FIG. 4]
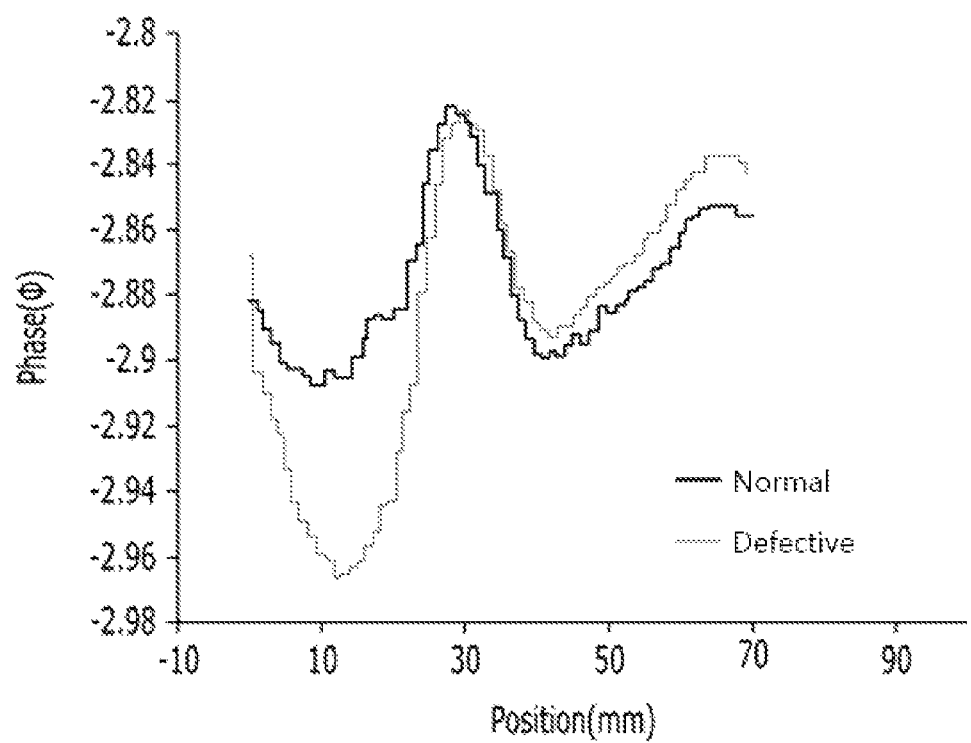

[FIG. 5]
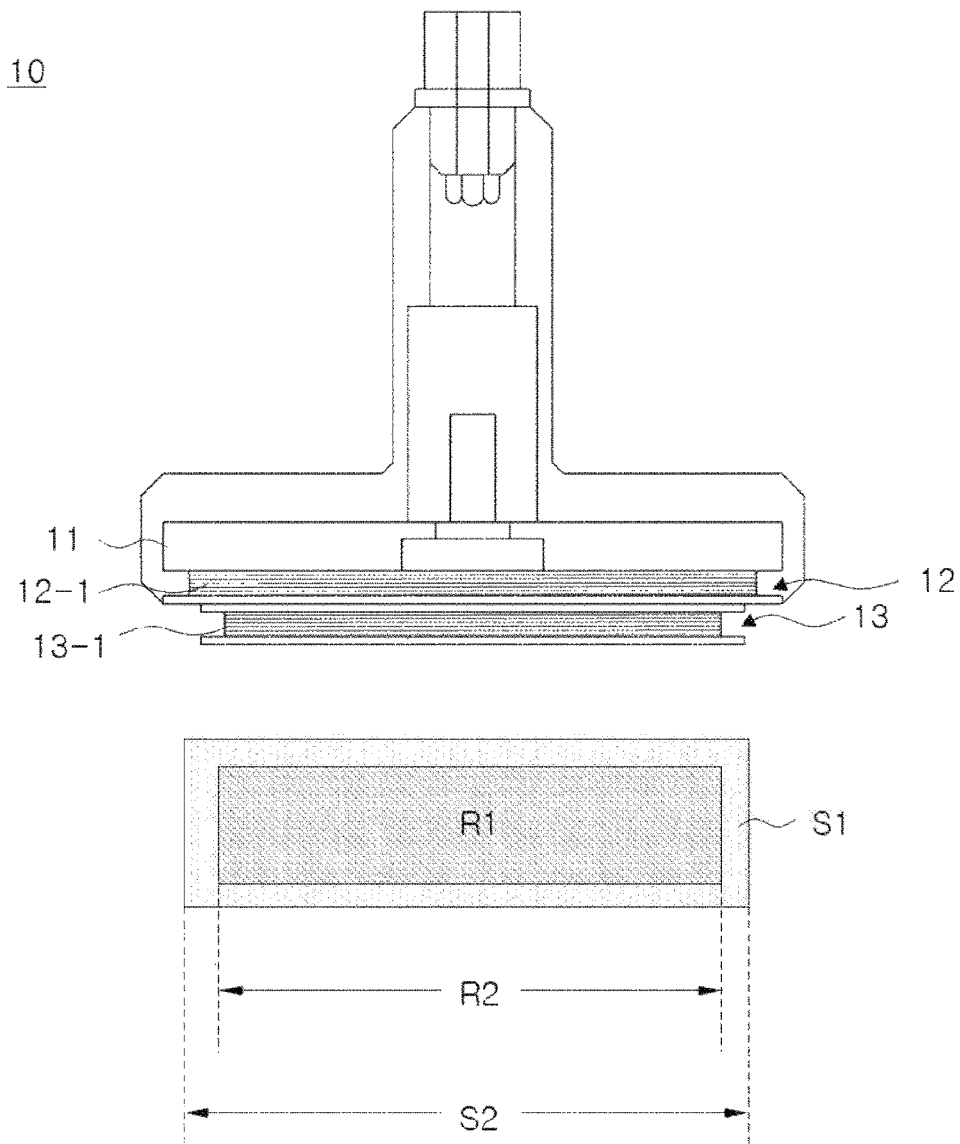

[FIG. 6]
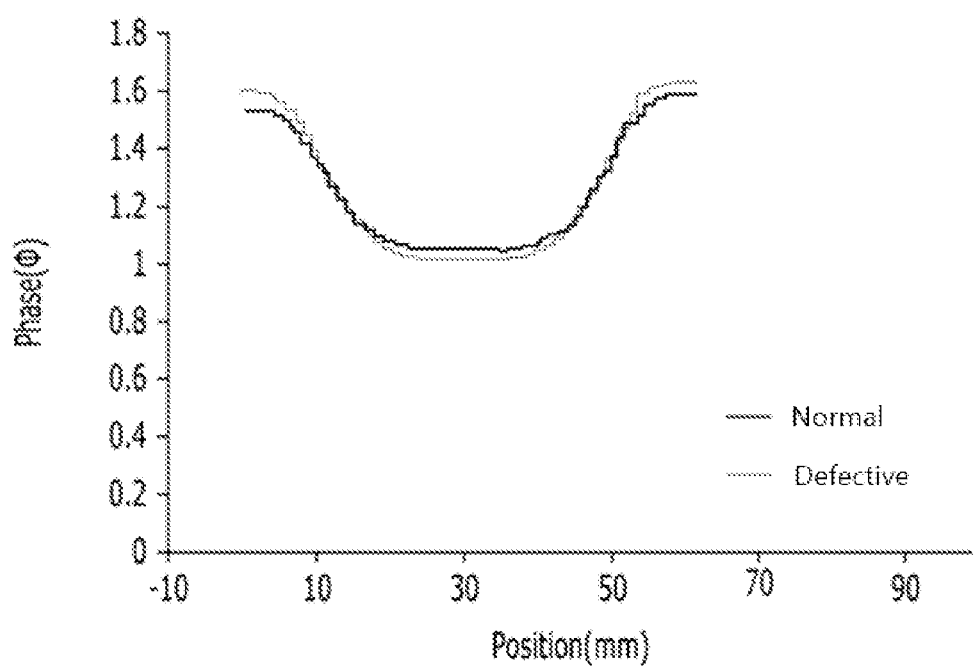

[FIG. 7]
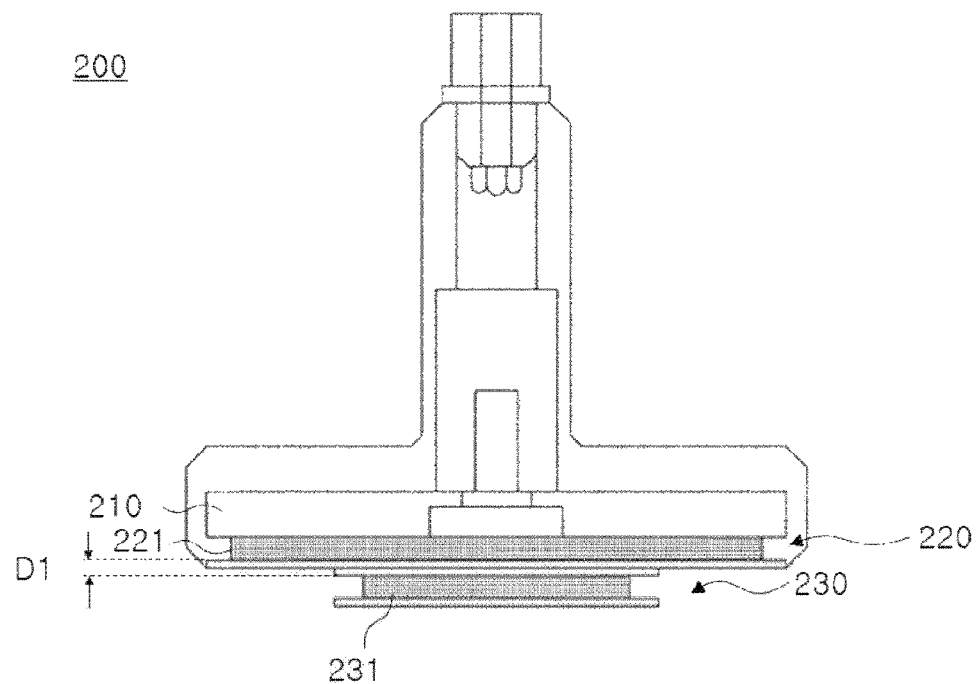

EDDY CURRENT SENSOR FOR DETECTING CRACK OF BATTERY CELL AND SYSTEM FOR DETECTING CRACK OF BATTERY INCLUDING THE SAME

TECHNICAL FIELD

This application claims the benefit of priority based on Korean Patent Application No. 10-2020-0147011, filed on Nov. 5, 2020, and the entire contents of the Korean patent application are incorporated herein by reference.

The present invention relates to an eddy current sensor for detecting a crack of a battery cell, and a system for detecting a crack of a battery cell including the eddy current sensor.

BACKGROUND ART

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

The secondary battery is classified according to the structure of the positive electrode, the negative electrode, and the electrode assembly having the structure of a separator interposed between the positive electrode and the negative electrode. Some examples thereof include a jelly-roll type (wound type) electrode assembly in which positive electrodes and negative electrodes of a long sheet type are wound with a separator interposed therebetween, a stack-folding type electrode assembly of a structure in which unit cells, such as bi-cells or full cells, stacked with positive and negative electrodes of a predetermined unit laminated through a separator, are wound, etc.

In addition, the secondary battery is manufactured by injecting an electrolyte, which is a liquid electrolyte, in a state where the electrode assembly is accommodated in the battery container, and sealing the battery container.

During the manufacturing process of the above electrode or the assembly process of the electrode assembly, cracks may occur on the electrodes, tabs, and welds due to differences in elongation between a coated part and an uncoated part, physical external force due to welding, etc., and such cracks may cause low voltage defects.

However, in the case of a stack-folding type battery cell, due to the characteristics of the stack-folding process, assembly defects occurring during the folding process cannot be easily found through vision inspection due to cracks inside the folding cell, and there is no method for non-destructively detecting cracks in the sealed battery cell after sealing is completed.

As such, there is a need for an apparatus and method for non-destructively detecting a defect such as a crack inside a battery cell.

DISCLOSURE

Technical Problem

An object of the present invention is to provide an eddy current sensor for non-destructively detecting a crack of a battery cell, and a system for detecting a crack of a battery cell including the eddy current sensor.

Technical Solution

The present invention is believed to solve at least some of the above problems. For example, an aspect of the present invention provides an eddy current sensor for detecting a crack of a battery cell. In one example, an eddy current sensor according to the present invention includes: a probe; a transmission unit which is arranged on a probe and has a structure on which a transmitting coil, which induces an eddy current to a target battery cell, is wound; and a receiving unit which is arranged on the probe and is arranged in a region spaced apart from the transmission unit, and has a structure on which a receiving coil, which senses a signal change by the eddy current induced to the battery cell by the transmitting coil, is wound. At this time, a cross-sectional area of the transmission unit, on which the transmitting coil has been wound, is greater than a cross-sectional area of the receiving unit on which the receiving coil has been wound.

In one example, a ratio (S1:R1) of the cross-sectional area S1 of the transmission unit to the cross-sectional area R1 of the receiving unit is in a range of 1.5:1 to 10:1.

In another example, a ratio (S2:R2) of a width S2 of the transmission unit to a width R2 of the receiving unit is in a range of 1.5:1 to 10:1. At this time, a width S2 of the transmission unit may be in a range of 1 to 100 mm and may correspond to a length L of a battery cell evaluation region, and a width S2 of the receiving unit may be in a range of 0.5 to 70 mm.

In one example, the transmission unit and the receiving unit may be spaced apart from each other at an interval of 1 to 50 mm.

Further, the transmission unit and the receiving unit have a winding groove in a region on which each of the transmitting coil and the receiving coil are wound.

In another example, a diameter of the transmitting coil and the receiving coil is in a range of 0.02 to 10 mm.

Further, the present invention provides a system for detecting a crack of a battery cell including the above-described eddy current sensor for detecting a crack of a battery cell. In one example, a system for detecting a crack of a battery cell according to the present invention includes: an eddy current sensor; a signal-receiving unit which receives a signal measured in the eddy current sensor; and a data processing unit which determines whether there is a crack in a target battery cell based on an amplitude and phase difference distribution of a signal received in the signal-receiving unit.

Further, the system for detecting a crack of a battery cell according to the present invention may further include an output unit which outputs a result value determined in the data processing unit and a storage unit which stores the result value.

Advantageous Effects

The present invention relates to an eddy current sensor for detecting a crack in a battery cell, and a system for detecting a crack of a battery cell including the eddy current sensor.

According to the present invention, it is possible to easily detect a crack generated in an electrode, an electrode tab or a welded portion.

In particular, in the eddy current sensor, the cross-sectional area of the transmission unit is greater than the cross-sectional area of the receiving unit. As such, the difference between a normal signal and a defective signal significantly increases. As such, the accuracy of the detection can be enhanced.

BRIEF DESCRIPTION OF THE DRAWINGS

FIG. 1 is a schematic diagram showing the principle of detection of cracks using eddy currents.

FIG. 2 is a schematic diagram of an eddy current sensor according to an embodiment of the present invention.

FIG. 3 illustrates an example of detecting a crack of a battery cell using an eddy current sensor according to one embodiment of the present invention.

FIG. 4 is a graph showing a result of detecting a crack of a battery cell using an eddy current sensor according to one embodiment of the present invention.

FIG. 5 is a schematic diagram of a conventional eddy current sensor.

FIG. 6 is a graph showing a result of detecting a crack of a battery cell using a conventional eddy current sensor.

FIG. 7 is a schematic diagram of an eddy current sensor according to another embodiment of the present invention.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present invention provides an eddy current sensor for detecting a crack of a battery cell, and a system for detecting a crack of a battery cell including the eddy current sensor.

Generally, the secondary battery is manufactured by injecting an electrolyte, which is a liquid electrolyte, in a state where the electrode assembly is accommodated in the battery container, and sealing the battery container. During the manufacturing process of the above electrode or the assembly process of the electrode assembly, cracks may occur on the electrodes, tabs, and welds due to differences in elongation between a coated part and an uncoated part, physical external force due to welding, etc., and such cracks may cause low voltage defects. However, in the case of a stack-folding type battery cell, due to the characteristics of the stack-folding process, assembly defects occurring during the folding process cannot be easily found through vision inspection due to cracks inside the folding cell, and there is no method for non-destructively detecting cracks in the sealed battery cell after sealing is completed.

As such, the present invention provides an eddy current sensor for non-destructively detecting a crack of a battery cell, and a system for detecting a crack of a battery cell including the eddy current sensor. In particular, in the eddy current sensor according to the present invention, the cross-sectional area of the transmission unit is greater than the cross-sectional area of the receiving unit. As such, the difference between a normal signal and a defective signal significantly increases. As such, the accuracy of the detection can be enhanced.

Hereinafter, an eddy current sensor for detecting a crack of a battery cell, and a system for detecting a crack of a battery cell including the eddy current sensor will be described in detail.

In one example, an eddy current sensor for detecting a crack of a battery cell according to the present invention includes: a probe; a transmission unit which is arranged on a probe and has a structure on which a transmitting coil, which induces an eddy current to a target battery cell, is wound; and a receiving unit which is arranged on the probe and is arranged in a region spaced apart from the transmission unit, and has a structure on which a receiving coil, which senses a signal change by the eddy current induced to the battery cell by the transmitting coil, is wound. At this time, a cross-sectional area of the transmission unit, on which the transmitting coil has been wound, is greater than a cross-sectional area of the receiving unit on which the receiving coil has been wound.

The present invention uses the principle of detection of cracks using eddy currents. FIG. 1 is a schematic diagram showing the principle of detection of cracks using eddy currents.

Referring to FIG. 1, an alternating current is flown into a coil, a primary magnetic field is generated around the coil. If the transmitting coil forming the primary magnetic field gets close to a conductor, induced electromotive force is generated in the conductor by an electromagnetic induction phenomenon, and the induced electromotive force allows electric current interfering with the primary magnetic field to flow according to Lenz's law. Herein, this electric current is called an eddy current. A secondary magnetic field, which interferes with the primary magnetic field, is generated by the eddy current. At this time, the eddy current is changed according to changes of the state, position, defect, and material, etc. of the conductor, which causes the change in the secondary magnetic field, and this change in the secondary magnetic field causes the change in the primary magnetic field. This again causes the change in the impedance of the coil, and the voltage and phase of the circuit of the inspection device for measuring the changes are also changed. As such, the change in the circuit value is amplified and may be output in the form in which the shape of the signal can be readable.

Namely, the eddy current sensor according to the present invention adds an alternating current to the transmitting coil to thereby induce an eddy current on the target surface, and a crack in the battery cell can be detected by sensing a signal change by the eddy current induced in the target by the receiving coil. If there is a change in the eddy current signal, a crack can be detected because it is understood that the eddy current signal has been changed due to a crack in the electrode, the electrode tab or the welded portion.

Further, in the present invention, the crack in the battery cell means a crack generated on an electrode, an electrode tab, and a weld. In a specific example, a crack of the electrode can be explained as follows. After the electrode mixture containing the electrode active material, binder, conductive material, etc. is applied on the current collector, the electrode manufactured through an electrode process such as drying and rolling may have a crack, on the current collector, caused by a difference in elongation, etc. between the current collector and the electrode mixture during the electrode process. Such a crack may be called a crack of the electrode. Further, the crack of the electrode tab may be a crack generated due to the difference in elongation between a coated part and an uncoated part or a crack caused by vibration or external force during welding due to the accumulation of stress on the wrinkles at the boundary. Further, the crack on a welding portion may be a non-weld portion formed by insufficient welding during welding or a crack generated during a welding process.

Cracks generated on the electrodes, electrode tabs, and welds listed above cannot be observed from the outside of the battery case because the inside of the battery cell is covered by the battery case when the electrode assembly is sealed with a battery case such as a laminate sheet through a sealing process. However, if the crack detection device using the eddy current of the present invention is used, there is an effect capable of detecting the cracks.

In one example, in the eddy current sensor according to the present invention, a ratio (S1:R1) of the cross-sectional area S1 of the transmission unit to the cross-sectional area R1 of the receiving unit is in a range of 1.5:1 to 10:1. Specifically, the ratio (S1:R1) of the cross-sectional area S1 of the transmission unit to the cross-sectional area R1 of the receiving unit is in a range of 1.5:1 to 8:1, 1.6:1 to 6:1, 1.7:1 to 4:1, or 3:1. For example, the ratio (S1:R1) of the cross-sectional area S1 of the transmission unit to the cross-sectional area R1 of the receiving unit is 3:1.

If the cross-sectional area S1 of the transmission unit is less than 1.5 times of the cross-sectional area R1 of the receiving unit, the area of the magnetic field generated in the transmitting coil is similar to the area of the magnetic field received in the receiving coil because the cross-sectional area of the transmission unit is similar to that of the receiving unit. As such, it may be difficult to distinguish a normal signal from a defective signal. Namely, it may be difficult to detect a crack inside a battery cell. Further, if the cross-sectional area S1 of the transmission unit exceeds 10 times of the cross-sectional area R1 of the receiving unit, it may be difficult to detect a signal change by eddy currents induced in a target battery cell due to the excessively small cross-sectional area of the receiving unit, compared to the cross-sectional area of the transmission unit.

In one example, in an eddy current sensor 100 according to the present invention, a ratio (S2:R2) of the width S2 of the transmission unit to the width R2 of the receiving unit is in a range of 1.5:1 to 10:1. Specifically, the ratio (S2:R2) of the width S2 of the transmission unit to the width R2 of the receiving unit is in a range of 1:7:1 to 8:1, 1.9:1 to 6:1, 2:1 to 4:1, or 2:5:1 to 3.5:1. For example, the ratio (S2:R2) of the width S2 of the transmission unit to the width R2 of the receiving unit is 3:1. If the width S2 of the transmission unit is less than 1.5 times of the width R2 of the receiving unit, the area of the magnetic field generated in the transmitting coil is similar to the area of the magnetic field received in the receiving coil because the width of the transmission unit is similar to that of the receiving unit. As such, it may be difficult to distinguish a normal signal from a defective signal. Namely, it may be difficult to detect a crack inside a battery cell. Further, if the width S2 of the transmission unit exceeds 10 times of the width R2 of the receiving unit, it may be difficult to detect a signal change by eddy currents induced in a target battery cell due to the excessively small width R2 of the receiving unit, compared to the width S2 of the transmission unit.

In a specific example, in the eddy current sensor according to the present invention, the width S2 of the transmission unit in a range of 1 to 100 mm. The width S2 of the transmission unit may be in a range of 5 to 90 mm, 10 to 80 mm, 15 to 70 mm or about 60 mm. In a specific example, the width S2 of the transmission unit has a structure corresponding to the length L of the evaluation region of the target battery cell. This is to easily induce eddy currents in the evaluation region. For example, in the eddy current sensor according to the present invention, the width S2 of the transmission unit is 60 mm, and the width R2 of the receiving unit is 20 mm. Further, when determining whether there is a crack in an electrode having a 60 mm width, the crack of the battery cell can be detected using an eddy current sensor where the width S2 of the transmission unit is 60 mm. Further, when the width S2 of the transmission unit is less than 1 mm, the width S2 of the transmission unit may be smaller than the length of the evaluation target, and accordingly, it is not possible to generate a magnetic field in the entire evaluation region. On the other hand, when the width S2 of the transmission unit exceeds 100 mm, the width S2 of the transmission unit is much greater than the length of the evaluation target, and accordingly, the accuracy of the inspection may be low.

Further, in the eddy current sensor according to the present invention, the width S2 of the receiving unit may be in a range of 0.5 to 70 mm. The width S2 of the receiving unit may be in a range of 1 to 60 mm, 5 to 50 mm, 10 to 40 mm, or about 20 mm. For example, in the eddy current sensor according to the present invention, the width S2 of the transmission unit is 60 mm, and the width R2 of the receiving unit is 20 mm, as described above.

In one example, in the eddy current sensor according to the present invention, the transmission unit and the receiving unit have a structure where a winding groove is formed in a region where a transmitting coil and a receiving coil are wound. In a specific example, the winding groove has a structure formed along an outer peripheral surface of the transmission unit and the receiving unit of a probe. The transmitting coil and the receiving coil can be more stably wound on the probe by the winding groove.

In another example, the eddy current sensor for detecting a crack inside a battery cell according to the present invention includes a transmission unit on which a transmitting coil is wound and a receiving unit on which a receiving coil is wound. At this time, the transmission unit and the receiving unit may be spaced apart from each other at an interval of 1 to 50 mm. In a specific example, the interval between the transmission unit and the receiving unit may be in the range of 3 to 40 mm, 6 to 30 mm, or 8 to 20 mm. For example, the interval between the transmission unit and the receiving unit may be 10 mm. Further, the transmission unit and the receiving unit may be arranged on the same plane. However, in this case, there may be an interference between the magnetic field generated in the transmitting coil and the magnetic field received in the receiving coil. Hence, it is preferable that the transmission unit is spaced apart from by the receiving unit in the above-described range.

Further, the eddy current sensor for detecting a crack inside a battery cell according to the present invention includes a transmission unit on which a transmitting coil is wound and a receiving unit on which a receiving coil is wound. At this time, the diameter of the transmitting coil and the receiving coil may be in a range of 0.02 to 10 mm. However, the present invention is not limited thereto.

Further, the present invention provides a system for detecting a crack of a battery cell including the above-described eddy current sensor. In one example, the system includes: the eddy current sensor; a signal-receiving unit which receives a signal measured in the eddy current sensor; and a data processing unit which determines whether there is a crack in a target battery cell based on an amplitude and phase difference distribution of a signal received in the signal-receiving unit.

At this time, if the measured signal of the target battery cell is beyond the range of the reference signal based on the reference signal of a normal battery cell, the data processing unit determines the battery cell as being defective.

In one example, the system for detecting a crack of a battery cell according to the present invention may further include an output unit which outputs a result value determined in the data processing unit and a storage unit which stores the result value.

Further, the target battery cell may be a pouch-type unit cell. Specifically, the pouch type unit cell may have a structure that an electrode assembly having a positive electrode/separator/negative electrode structure is embedded in an exterior material of the laminate sheet in a state that is connected to electrode leads formed outside the exterior material. The electrode leads may be drawn to the outside of the sheet and may be extended in the same or opposite direction to each other.

DETAILED DESCRIPTION OF THE PREFERRED EMBODIMENTS

Hereinafter, various forms of an eddy current sensor for detecting a crack inside a battery cell according to the present invention will be described in detail.

First Embodiment

FIG. 2 is a schematic diagram of an eddy current sensor according to an embodiment of the present invention.

Referring to FIG. 2, an eddy current sensor 100 for detecting a crack of an inside of a battery cell according to the present invention includes: a probe 110; a transmission unit 120 which is arranged on a probe 110 and has a structure on which a transmitting coil 121, which induces an eddy current to a target battery cell, is wound; and a receiving unit 130 which is arranged on the probe and is arranged in a region spaced apart from the transmission unit 120, and has a structure on which a receiving coil 131, which senses a signal change by the eddy current induced to the battery cell by the transmitting coil 121, is wound.

Specifically, if an alternating current is applied to the transmitting coil 121, a primary magnetic field is formed around the transmitting coil. In the drawings, the coil has a spring shape, but is not limited thereto. When the coil in which the primary magnetic field is formed is brought to the battery cell as an object to be inspected, an induced electromotive force is generated in the battery cell due to electromagnetic induction, and eddy currents interfering with the primary magnetic field flow. Likewise, the transmitting coil 121 induces eddy currents in the target battery cell.

Further, the receiving coil 131 is positioned on the lower portion of the transmitting coil 121 and is positioned closer to the target battery cell than the transmitting coil 121. The receiving coil 131 senses the eddy current signal induced by the transmitting coil 121. The receiving coil 131 detects attenuated eddy current signals, which are generated by attenuation such as formation, reflection, and absorption of the eddy current induced by the transmitting coil 121, due to factors such as state, position, defect, and material of the target battery cell. Hence, when there is a crack inside a battery cell, a change occurs in the eddy current signal, and the receiving coil senses the eddy current signal and transmits the sensed eddy current signal to the signal-receiving unit and the data processing unit of the system for detecting a crack of a battery cell.

Further, in the eddy current sensor 100 according to the present invention, the cross-sectional area S1 of the transmission unit 120, on which the transmitting coil 121 is wound, is greater than the cross-sectional area R1 of the receiving unit 130, on which the receiving coil 131 is wound. Herein, the cross-sectional area S1 of the transmission unit 120 means the probe cross-sectional area of the region where the transmitting coil 121 is wound, and the cross-sectional area of the receiving unit 130 means the probe cross-sectional area of the region where the receiving coil 131 is wound.

In particular, in the eddy current sensor 100 according to the present invention, the cross-sectional area S1 of the transmission unit, on which the transmitting coil 121 is wound, is greater than the cross-sectional area R1 of the receiving unit 130, on which the receiving coil 131 is wound. As such, the area of the magnetic field generated in the transmitting coil 121 is set to be different from the area of the magnetic field received in the receiving coil 131. Specifically, the transmitting coil 121 may generate a strong and uniform primary magnetic field, and the receiving coil 131 may receive a magnetic field of an area which is different from that of the primary magnetic field generated in the transmitting coil 121. As such, the eddy current sensor 100 of the present invention may enhance the accuracy of the detection of a crack inside the target battery cell.

In the eddy current sensor 100 according to the present invention, a ratio (S1:R1) of the cross-sectional area S1 of the transmission unit 120 to the cross-sectional area R1 of the receiving unit 130 is in a range of 1.5:1 to 10:1. For example, the ratio (S1:R1) of the cross-sectional area S1 of the transmission unit 120 to the cross-sectional area R1 of the receiving unit 130 is 2:1.

Further, in an eddy current sensor 100 according to the present invention, a ratio (S2:R2) of the width S2 of the transmission unit to the width R2 of the receiving unit is in a range of 1.5:1 to 10:1. For example, the ratio (S2:R2) of the width S2 of the transmission unit to the width R2 of the receiving unit is 3:1. At this time, the width S2 of the transmission unit is in the range of 1 to 100 mm. Specifically, the width S2 of the transmission unit has a structure corresponding to the length L of the evaluation region of the target battery cell. This is to easily induce eddy currents in the evaluation region. Specifically, in the eddy current sensor 100 according to the present invention, the width S2 of the transmission unit is 60 mm, and the width R2 of the receiving unit is 20 mm. Further, when evaluating whether there is a crack in a battery tab having a 20 mm width, the width S2 of the transmission unit may be 20 mm.

Further, in the eddy current sensor 100 according to the present invention, the transmission unit 120 and the receiving unit 130 have a structure where winding grooves 122 and 132 are formed in a region where the transmitting coil 121 and the receiving coil 131 are wound, respectively. Specifically, the winding grooves 122 and 132 are formed along the outer peripheral surface of the transmission unit 120 and the receiving unit 130 of each probe 110.

FIG. 3 illustrates an example of detecting a crack of a battery cell using an eddy current sensor according to one embodiment of the present invention. A crack inside the battery cell 1 was detected using an eddy current sensor 100 according to one embodiment of the present invention. After arranging the eddy current sensor 110 to be spaced apart from the target battery cell 1 by an interval of about 2 cm, an alternating current power source was applied to the eddy current sensor 100 to thereby detect a crack inside the battery cell 1. And the result is shown in FIG. 4.

FIG. 4 is a graph showing a result of detecting a crack of a battery cell using an eddy current sensor according to one embodiment of the present invention. Specifically, FIG. 4 shows amplitude and phase values according to the position of a normal cell and a battery cell where a crack was generated inside. Herein, the position means a distance between the eddy current sensor and the target battery cell.

Referring to FIG. 4, the shape of the waveform of the normal battery cell is significantly different from the shape of the waveform of a defective battery cell. Namely, according to the eddy current sensor for detecting a crack inside a battery cell according to the present invention, the detection accuracy increased.

First Comparative Embodiment

FIG. 5 is a schematic diagram of a conventional eddy current sensor.

Referring to FIG. 5, a conventional eddy current sensor 10 includes: a probe 11; and a transmission unit 12 on which a transmitting coil 12-1 is wound, and a receiving unit 13 on which a receiving coil 13-1 is wound. Herein, in the conventional eddy current sensor 10, the cross-sectional area S1 of the transmission unit 12 is very similar to the cross-sectional area R1 of the receiving unit 13.

Detection of a crack inside a battery cell was performed using the conventional eddy current sensor 10 in the same manner as in the first embodiment. And the result is shown in FIG. 6.

FIG. 6 is a graph showing a result of detecting a crack of a battery cell using a conventional eddy current sensor. Specifically, FIG. 6 shows amplitude and phase values according to the position of a normal cell and a battery cell where a crack was generated inside.

Referring to FIG. 6, the shape of the waveform of the normal battery cell is similar to the shape of the waveform of a defective battery cell. Namely, in the conventional eddy current sensor, in which the cross-sectional area of the transmission unit is very similar to that of the receiving unit, the detection accuracy was low at the time of detecting a crack inside a battery cell. Since the cross-sectional area of the transmission unit of the eddy current sensor is similar to the cross-sectional area of the receiving unit of the eddy current sensor, the area of the generated magnetic field is similar to the area of the measure magnetic field. As such, it is difficult to distinguish a normal signal from a defective signal.

Second Embodiment

FIG. 7 is a schematic diagram of an eddy current sensor according to another embodiment of the present invention.

Referring to FIG. 7, an eddy current sensor 200 for detecting a crack of an inside of a battery cell according to the present invention includes: a probe 210; a transmission unit 220 which is arranged on a probe 210 and has a structure on which a transmitting coil 221, which induces an eddy current to a target battery cell, is wound; and a receiving unit 230 which is arranged on the probe and is arranged in a region spaced apart from the transmission unit 220 by a predetermined interval, and has a structure on which a receiving coil 231, which senses a signal change by the eddy current induced to the battery cell by the transmitting coil 221, is wound.

At this time, the transmission unit 220 and the receiving unit 230 may be spaced apart from each other at an interval D1 of 1 to 50 mm. Specifically, the transmission unit 220 and the receiving unit 230 may be spaced apart from each other at an interval of 5 to 40 mm, 10 to 30 mm, or about 20 mm.

Further, the transmission unit 220 and the receiving unit 230 may be arranged on the same plane. However, in this case, there may be an interference between the magnetic field generated in the transmitting coil 221 and the magnetic field received in the receiving coil 231. Hence, the transmission unit 220 is preferably spaced apart from the receiving unit 230 in the above-described range. Specifically, the transmission unit 220 and the receiving unit 230 may be spaced apart from each other at an interval of 20 mm.

Since each component has been described above, the detailed description of each component will be omitted here.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

The invention claimed is:

1. An eddy current sensor for detecting a crack of an inside of a battery cell, the eddy current sensor comprising:
   a probe;
   a transmission unit which is arranged on a probe and has a structure on which a transmitting coil, which induces an eddy current to the battery cell, is wound; and
   a receiving unit which is arranged on the probe and is arranged in a region spaced apart from the transmission unit, and has a structure on which a receiving coil, which senses a signal change by the eddy current induced to the battery cell by the transmitting coil, is wound,
   wherein a cross-sectional area S1 of the transmission unit, on which the transmitting coil has been wound, is greater than a cross-sectional area R1 of the receiving unit on which the receiving coil has been wound, and
   a ratio (S1:R1) of the cross-sectional area S1 of the transmission unit to the cross-sectional area R1 of the receiving unit is in a range of 1.5:1 to 10:1, and the transmission unit and the receiving unit are spaced apart from each other at an interval of 1 to 50 mm.

2. The eddy current sensor of claim 1, wherein a ratio (S1:R1) of the cross-sectional area S1 of the transmission unit to the cross-sectional area R1 of the receiving unit is in a range of 1.5:1 to 3:1.

3. The eddy current sensor of claim 1, wherein a ratio (S2:R2) of a width S2 of the transmission unit to a width R2 of the receiving unit is in a range of 1.5:1 to 10:1.

4. The eddy current sensor of claim 1, wherein a width S2 of the transmission unit is in a range of 1 to 100 mm and corresponds to a length L of a battery cell evaluation region.

5. The eddy current sensor of claim 1, wherein a width S2 of the receiving unit is in a range of 0.5 to 70 mm.

6. The eddy current sensor of claim 1, wherein the transmission unit and the receiving unit have a winding groove in a region on which each of the transmitting coil and the receiving coil are wound.

7. The eddy current sensor of claim 1, wherein a diameter of the transmitting coil and the receiving coil is in a range of 0.02 to 10 mm.

8. A system for detecting a crack of a battery cell, comprising:
the eddy current sensor according to claim 1;
a signal-receiving unit which receives a signal measured in the eddy current sensor; and
a data processing unit which determines whether there is a crack in a target battery cell, based on an amplitude and phase difference distribution of a signal received in the signal-receiving unit.

9. The system of claim 8, further comprising: an output unit which outputs a result value determined in the data processing unit and a storage unit which stores the result value.

10. The eddy current sensor of claim 1, wherein a ratio (S2:R2) of a width S2 of the transmission unit to a width R2 of the receiving unit is in a range of 1.9:1 to 6:1.

11. The eddy current sensor of claim 1, wherein a ratio (S2:R2) of a width S2 of the transmission unit to a width R2 of the receiving unit is in a range of 2:1 to 4:1.

12. The eddy current sensor of claim 1, wherein a ratio (S2:R2) of a width S2 of the transmission unit to a width R2 of the receiving unit is in a range of 2.5:1 to 3.5:1.

13. The eddy current sensor of claim 1, wherein the transmission unit and the receiving unit are spaced apart from each other at an interval of 3 to 40 mm.

14. The eddy current sensor of claim 1, wherein the transmission unit and the receiving unit are spaced apart from each other at an interval of 6 to 30 mm.

15. The eddy current sensor of claim 1, wherein the transmission unit and the receiving unit are spaced apart from each other at an interval of 8 to 20 mm.

* * * * *